United States Patent
Rogers et al.

(10) Patent No.: US 9,953,366 B1
(45) Date of Patent: Apr. 24, 2018

(54) AUTO-CATEGORIZED MILEAGE TRACKING

(71) Applicants: Aaron David Rogers, Washington, UT (US); Ghanshyam Bhatt, Sunnyvale, CA (US); Talia Shereen Nour-Omid, Los Angeles, CA (US); Vidhi Shah, Menlo Park, CA (US); Brian Galutira Tan, Newark, CA (US)

(72) Inventors: Aaron David Rogers, Washington, UT (US); Ghanshyam Bhatt, Sunnyvale, CA (US); Talia Shereen Nour-Omid, Los Angeles, CA (US); Vidhi Shah, Menlo Park, CA (US); Brian Galutira Tan, Newark, CA (US)

(73) Assignee: Intuit Inc., Mountain View, CA (US)

(*) Notice: Subject to any disclaimer, the term of this patent is extended or adjusted under 35 U.S.C. 154(b) by 26 days.

(21) Appl. No.: 14/070,391

(22) Filed: Nov. 1, 2013

(51) Int. Cl.
*G06Q 40/00* (2012.01)
*G01C 21/00* (2006.01)

(52) U.S. Cl.
CPC ............ *G06Q 40/00* (2013.01); *G01C 21/00* (2013.01)

(58) Field of Classification Search
None
See application file for complete search history.

(56) References Cited

U.S. PATENT DOCUMENTS

| | | | |
|---|---|---|---|
| 5,787,373 A * | 7/1998 | Migues et al. | 701/527 |
| 6,434,510 B1 * | 8/2002 | Callaghan | 702/165 |
| 6,718,263 B1 * | 4/2004 | Glass et al. | 701/522 |
| 7,412,328 B2 * | 8/2008 | Uhlmann et al. | 701/431 |
| 7,756,617 B1 * | 7/2010 | Cluff et al. | 701/33.4 |
| 7,908,191 B1 * | 3/2011 | Dinamani et al. | 705/31 |
| 8,521,413 B2 * | 8/2013 | Koch | 701/300 |
| 2001/0020204 A1 * | 9/2001 | Runyon et al. | 701/35 |
| 2006/0200286 A1 * | 9/2006 | Kumagai et al. | 701/35 |
| 2010/0063904 A1 * | 3/2010 | Ronen et al. | 705/30 |
| 2013/0244210 A1 * | 9/2013 | Nath | G07C 5/008 434/65 |

OTHER PUBLICATIONS

GPS Insight, https://web.archive.org/web/20130928204144/http://www.gpsinsight.com/fleet-tracking/sample-reports, Sep. 28, 2013.*
GPS Insight—State Mileage Overview, https://web.archive.org/web/20150628170410/http://www.gpsinsight.com/sites/default/files/images/image/reports/gps-tracking-report-state-mileage.png, Sep. 28, 2013, also includes 2011 copyright assertion.*

* cited by examiner

*Primary Examiner* — James M McPherson
(74) *Attorney, Agent, or Firm* — FBFK PC

(57) ABSTRACT

A method, system, and computer readable medium for tracking mileage. The method includes obtaining global positions of a mobile device and timestamps corresponding to the global positions, and detecting, based on the global positions and the timestamps, a completed trip having global positions and timestamps. The global positions include an origin and a destination. The method further includes categorizing, from location categories, the origin into an origin location category, categorizing, from location categories, the destination into a destination location category, and categorizing, based on the origin location category and the destination location category, the completed trip into a completed trip category from trip categories. The method further includes calculating mileage based on the global positions of the completed trip, and storing, for the completed trip, the mileage and the completed trip category.

21 Claims, 5 Drawing Sheets

AUTO-CATEGORIZED MILEAGE TRACKING

BACKGROUND

Business expenses are the cost of carrying on a trade or business. Tax agencies and employers provide a mechanism for the person or entity having the cost of the business expense to have the business expense be reimbursed or to at least deduct the cost of the business expense from income. Some business expenses, such as restaurant meals with clients, have receipts for the expense and, thus, are easy to track. Other business expenses, such as mileage, may be more challenging.

SUMMARY

In general, in one aspect, the invention relates to a method for tracking mileage. The method includes obtaining global positions of a mobile device and timestamps corresponding to the global positions, and detecting, based on the global positions and the timestamps, a completed trip having global positions and timestamps. The global positions include an origin and a destination. The method further includes categorizing, from location categories, the origin into an origin location category, categorizing, from location categories, the destination into a destination location category, and categorizing, based on the origin location category and the destination location category, the completed trip into a completed trip category from trip categories. The method further includes calculating mileage based on the global positions of the completed trip, and storing, for the completed trip, the mileage and the completed trip category.

In general, in one aspect, the invention relates to a system for tracking mileage. The system includes memory and a computer processor for executing a mileage tracking application stored in memory and having a tracking engine, which causes the computer processor to detect, based on global positions and timestamps, a completed trip having global positions and timestamps. The positions include an origin and a destination. The tracking engine further causes the computer processor to categorize, from location categories, the origin into an origin location category, categorize, from location categories, the destination into a destination location category, and categorize, based on the origin location category and the destination location category, the completed trip into a completed trip category from trip categories. The tracking engine further causes the computer processor to calculate mileage based on the global positions of the completed trip, and store, for the completed trip, the mileage and the completed trip category.

In general, in one aspect, the invention relates to a computer readable storage medium storing instructions for tracking mileage, the instructions having functionality to detect, based on global positions and timestamps of a mobile device, a completed trip having global positions and timestamps. The global positions include an origin and a destination. The computer readable storage medium further stores instructions having functionality to categorize, from a location categories, the origin into an origin location category, categorize, from location categories, the destination into a destination location category, and categorize, based on the origin location category and the destination location category, the completed trip into a completed trip category from trip categories. The computer readable storage medium further stores instructions having functionality to calculate mileage based on the global positions of the completed trip, and store, for the completed trip, the mileage and the completed trip category.

Other aspects of the invention will be apparent from the following description and the appended claims.

DETAILED DESCRIPTION

Figure 1:
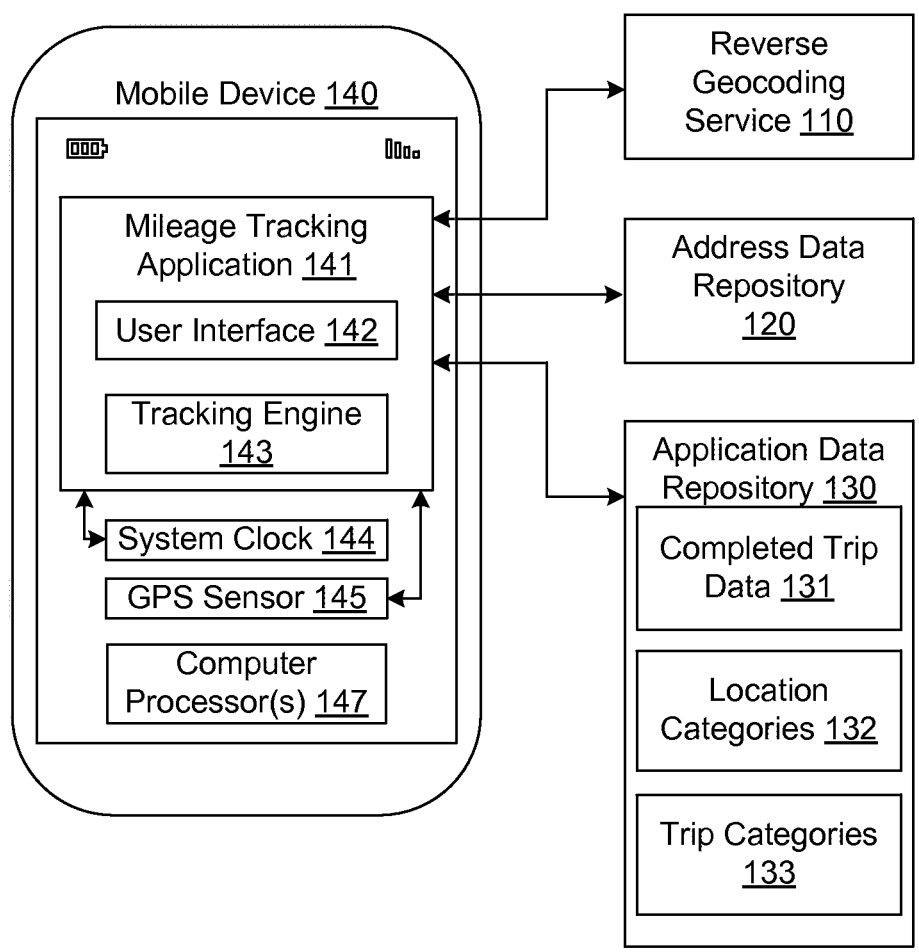
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for tracking mileage based on global positions of a mobile device. Specifically, one or more embodiments of the invention determine when a completed trip, determine a category for an origin of the completed trip and for the destination of the completed trip. Based on the category of a location identified by the origin and a location identified by the destination, the completed trip is categorized into a trip category. Further, mileage is calculated for the completed trip. Thus, the completed trip and category may be used to generate a report, such as a reimbursement request or tax return.

FIG. 1 shows a system in accordance with one embodiment of the invention. As shown in FIG. 1, the system has multiple components including a reverse geocoding service (110), an address data repository (120), an application data repository (130), and a mobile device (140). The components of the system may be located on the same device or may be located on separate devices connected by a network (e.g. the Internet) with wired and/or wireless segments. More than one of each separate component may execute on a device, as well as any combination of the aforementioned components within a given embodiment of the invention.

The reverse geocoding service (110) may be any combination of hardware, software and/or firmware. In one or more embodiments of the invention of the invention, the reverse geocoding service (110) is a service for converting a global position to a postal address. The global position may be, for example, defined in global positioning system (GPS) coordinates. For example, the reverse geocoding service, includes functionality to interpolate the street address from a range assigned to the road segment nearest to the position of a set of GPS coordinates. If the reverse geocoding service (110) receives GPS coordinates near the midpoint of a segment that starts with address 1 and ends with 100, the reverse geocoding service may include functionality to return a street address of around 50. The returned street address may be an actual address or an estimate of an address based on the predetermined range. The reverse geocoding service may be a third party reverse geocoding service.

In one or more embodiments of the invention, the address data repository (120) is any type of storage unit and/or device (e.g., a file system, database, collection of tables, or any other storage mechanism) for storing data. Further, the address data repository (120) may include multiple different storage units and/or devices. The multiple different storage units and/or devices may or may not be of the same type or located at the same physical site.

The address data repository (120) stores information relating location name to the location names' corresponding postal addresses. Specifically, the address data repository (120) maintains a mapping between location names and postal addresses. A location name is an identifier of the entity (e.g., individual name, business name, family name, government agency, or other entity) located at the postal address. The location name may be based on having a possessory interest in the address. When a postal address is submitted to the address data repository (120), the address data repository (120) includes functionality to return the location name that occupies the address. An example of a location name may be Chicago City Hall, or the Jones family residence. Various forms of address data repositories exist, including, for example, city business records or county residential records.

In one or more embodiments of the invention, the application data repository (130) is any type of storage unit and/or device (e.g., a file system, database, collection of tables, or any other storage mechanism) for storing data. Further, the application data repository (130) may include multiple different storage units and/or devices. The multiple different storage units and/or devices may or may not be of the same type or located at the same physical site.

The application data repository (130) stores completed trip data (131), location categories (132), and trip categories (133). The completed trip data (131) includes travel data for relating a completed trip to a trip category (133). For example, the completed trip data (131) may include timestamps, global positions, and location categories. Global positions and timestamps are discussed further below. The location categories (132) are categories that describe the use of a corresponding location with respect to the user. In other words, the location categories define the user's relation to the corresponding location. For example, a location category may be workplace, home, client, business, personal, or any other category defined in relation to the user. The trip categories (133) are categories that define the reason for the trip by the user. For example, a trip category may be deductible, non-deductible, business, personal, charitable, medical, relocation, or any other category defining the reason of the trip.

The mobile device (140) is a hardware mobile device capable of executing software (e.g., a mobile application). Examples of a mobile device (140) may include, but are not limited to, a smartphone, a laptop computer, a tablet computer, a PDA, a navigation device, and a netbook computer. The mobile device (140) may include any amount of usage data and/or application data.

For example, the mobile device (140) may include one or more computer processor(s) (147), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The computer processor(s) (147) may be an integrated circuit for processing instructions. For example, the computer processor(s) (147) may be one or more cores or micro-cores of a processor. The mobile device (140) may also include one or more input device(s), such as a touchscreen, microphone, touchpad, electronic pen, or any other type of input device. Further, the mobile device (140) may include one or more output device(s), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The mobile device may be connected to a network (e.g., a local area network (LAN), a wide area network (WAN) such as the Internet, a mobile network, or any other type of network) via a network interface connection. The input and output device(s) may be locally or remotely (e.g., via the network) connected to the computer processor(s) (147), memory, and storage device(s). Many different types of mobile devices exist, and the aforementioned input and output device(s) may take other forms.

In one or more embodiments of the invention, the mobile device (140) includes a mileage tracking application (141), a system clock (144), and a global positioning system ("GPS") engine (145). Each of these components is discussed below.

The system clock (144) is any combination of software, firmware, and/or hardware that executes on the mobile device (140) to track system time as defined by the operating system of the mobile device (140). In one or more embodiments of the invention, the system clock (144) includes functionality to return a timestamp corresponding to the current system time when the system clock (144) is called.

The GPS sensor (145) is any combination of software, firmware, and/or hardware that executes on the mobile device (140) to track the global position of the mobile device (140). The GPS sensor may be resident on the mobile device, or via a wireless connection with another source of GPS information, for example, a mobile access point. In one or more embodiments of the invention, the GPS sensor (145) includes functionality to return GPS coordinates detailing the global position of the mobile device (140).

The mileage tracking application (141) is a software application that executes on the mobile device (140). The mileage tracking application (141) may include a user interface (142) and a tracking engine (143).

The user interface (142) includes functionality to receive input from a user and to transmit output to a user. The user interface may be graphical, textual, auditory, or a combination thereof. The user interface (142) may include input modules that include functionality to receive the user's selection of location categories, trip categories, location names, requests to divide or combine completed trips. The user interface may include output modules that include functionality to present a mileage report relating statistics corresponding to the user's mileage to trip categories for one or more completed trips.

The tracking engine (143) includes functionality to track trips performed by the user while the user has the mobile device. Tracking trips include identifying and classifying trips. Specifically, the tracking engine (143) includes functionality to communicate with the system clock (144) and the GPS sensor (145) to obtain the system time and the global position of the mobile device (140). The tracking engine (143) may include functionality to obtain the position and the time simultaneously or nearly simultaneously to increase the accuracy of the data. The tracking engine may also functionality to detect an origin and a destination of a completed trip. Further, the tracking engine (143) may include functionality to send data to and receive data from a reverse geocoding service (110), an address data repository (120), and an application data repository (130).

The tracking engine (143) may include functionality to categorize location names into location categories and completed trips into trip categories, auto-detect location categories without input from the user after learning one or more attributes of the user, and/or assign location categories according to previously-entered user input, or according to input obtained from the user at runtime. The mileage tracking application (141) may include functionality to calculate and store mileage and generate mileage reports.

While FIG. 1 shows a configuration of components, other configurations may be used without departing from the scope of the invention. For example, various components may be combined to create a single component. As another example, the functionality performed by a single component may be performed by two or more components.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor (147) with associated physical memory. The node may alternatively correspond to a computer processor (147) or micro-core of a computer processor (147) with shared memory and/or resources.

FIGS. 2-6 show flowcharts in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

Figure 2:
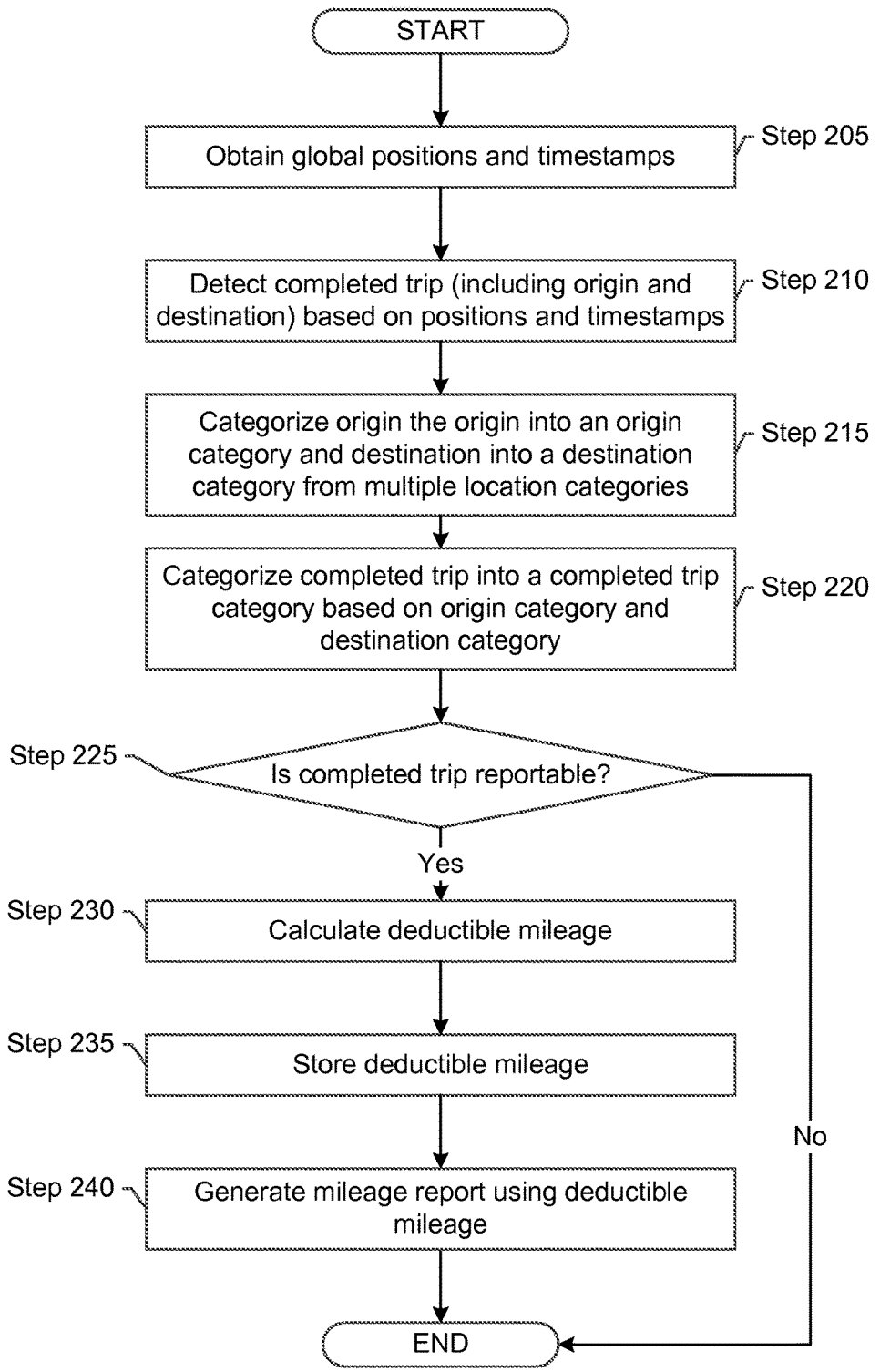
FIGS. 2-6 show flowcharts in accordance with one or more embodiments of the invention.

FIG. 2 shows a flowchart for tracking mileage in accordance with one or more embodiments of the invention. The process shown in FIG. 2 may be used, for example, with the system of FIG. 1 to track mileage. The sequence of steps shown in FIG. 2 may differ among embodiments of the invention, and one or more of the steps may be optional.

In Step 205, global positions and timestamps of the mobile device are obtained. For example, in one or more embodiments of the invention, the tracking engine may obtain global positions of the mobile device from the GPS sensor. The tracking engine may obtain multiple timestamps corresponding to the global positions from the system clock. For example, a user's mobile device travels with a user in a motor vehicle along US Interstate Highway 35 ("IH-35"), departing from San Antonio, Tex. at 5 o'clock and arriving in Austin, Tex. at 6 o'clock. The global positions obtained may include at least the device's initial position in San Antonio, having a timestamp of 5:00, and the device's final position in Austin, having a timestamp of 6:00. In addition, the positions and timestamps obtained may include one or more additional positions along IH-35 and the time(s) the device reaches the additional positions.

In Step 210, a completed trip is detected based on the global positions and timestamps previously obtained. In one or more embodiments of the invention, one or more algorithms performed on the position and timestamp data may indicate when the device is in motion and when the device is at rest. An origin of the completed trip may be detected when the device begins to travel at a sufficient velocity to indicate that it is traveling in a motor vehicle. A destination of the completed trip may be detected when the device stops moving or slows to a sufficient velocity to indicate that it is no longer traveling in a motor vehicle. Identifying a completed trip may be performed, for example, as discussed below and in FIG. 3.

In Step 215, the origin of the completed trip is categorized into an origin category and the destination of the completed trip is categorized into a destination category from multiple location categories. In other words, a location category is selected for the origin and a location category is selected for the destination. Categorizing the origin and the destination of the completed trip may be performed, for example, as discussed in FIG. 4.

In Step 220, the completed trip is categorized based on the origin category and the destination category to obtain a completed trip category. The mileage tracking application may include a set of rules relating location category combinations to trip categories. For example, any trip having either an origin or a destination of home may be categorized as personal. As another example, if a completed trip starts at a location having workplace category and ends at a location having a client category, the completed trip may be appropriately categorized as a business trip. The completed trip category may also be queried at any time from the user. Similarly, if the completed trip category starts at a location having hotel category and ends at a location having a client category, the completed trip may be categorized as a business trip. In one or more embodiments of the invention, if the trip from the origin to the destination has been previously traveled and categorized (either automatically or by the user), the stored category may be retrieved from the application data repository and assigned to the completed trip.

In Step 225, a determination is made whether the completed trip is reportable based on the completed trip category. A reportable trip is a trip that may be included in a report, such as a tax return, an expense reimbursement form, or other report. For example, a reportable trip may be a business trip, a charity trip, medical trip, or other trip. For example, if the completed trip is categorized as a business trip, the completed trip may be determined to be deductible and, therefore, reportable. If the completed trip is categorized as a personal trip, the completed trip may be determined to be non-deductible and, therefore, non-reportable. If the completed trip is non-reportable, then the process may proceed to end. If the completed trip is reportable, then the process may proceed to Step 230.

In Step 230, if a determination is made that the completed trip is reportable, mileage may be calculated based on the global positions in the completed trip. In one or more embodiments of the invention, the linear distances between all positions in the completed trip are calculated and aggregated to obtain a total mileage. In another embodiment, a route is reconstructed by plotting the positions in the completed trip and matching the plotted positions to a known road or set of roads. The mileage may then be calculated according to the length of the route.

In Step 235, the mileage is stored. In one or more embodiments of the invention, the mileage may be stored in memory on the mobile device, the application data repository, or elsewhere.

In Step 240, a mileage report is generated by the mileage tracking application using the mileage previously calculated and stored. The mileage report may be generated using information related to completed trips retrieved from the application data repository. The mileage report may include, without limitation, information related to aggregate mileage, aggregate mileage, individual completed trip mileage, trip categories, location categories, origins, destinations, global positions, and timestamps for all prior completed trips. Once generated, for example, the mileage report may be consulted or used when filing taxes. By way of another example, the mileage report may be transmitted to an employer so that the user is able to accurately report expenses resulting from a business or otherwise reportable trip. For example, a user's mileage report may indicate that the user traveled from San Antonio to Houston and back, a total distance of 400 miles, on three separate business trips in 2013. The user's mileage report may indicate that the user has traveled 1200 miles in 2013. The user may then provide this information to the government as part of his or her tax documents. Alternatively, the user may provide this information to his or her employer and the employer may reimburse the user for expenses, taking into consideration the price of gasoline and the fuel efficiency of the vehicle driven.

Figure 3:
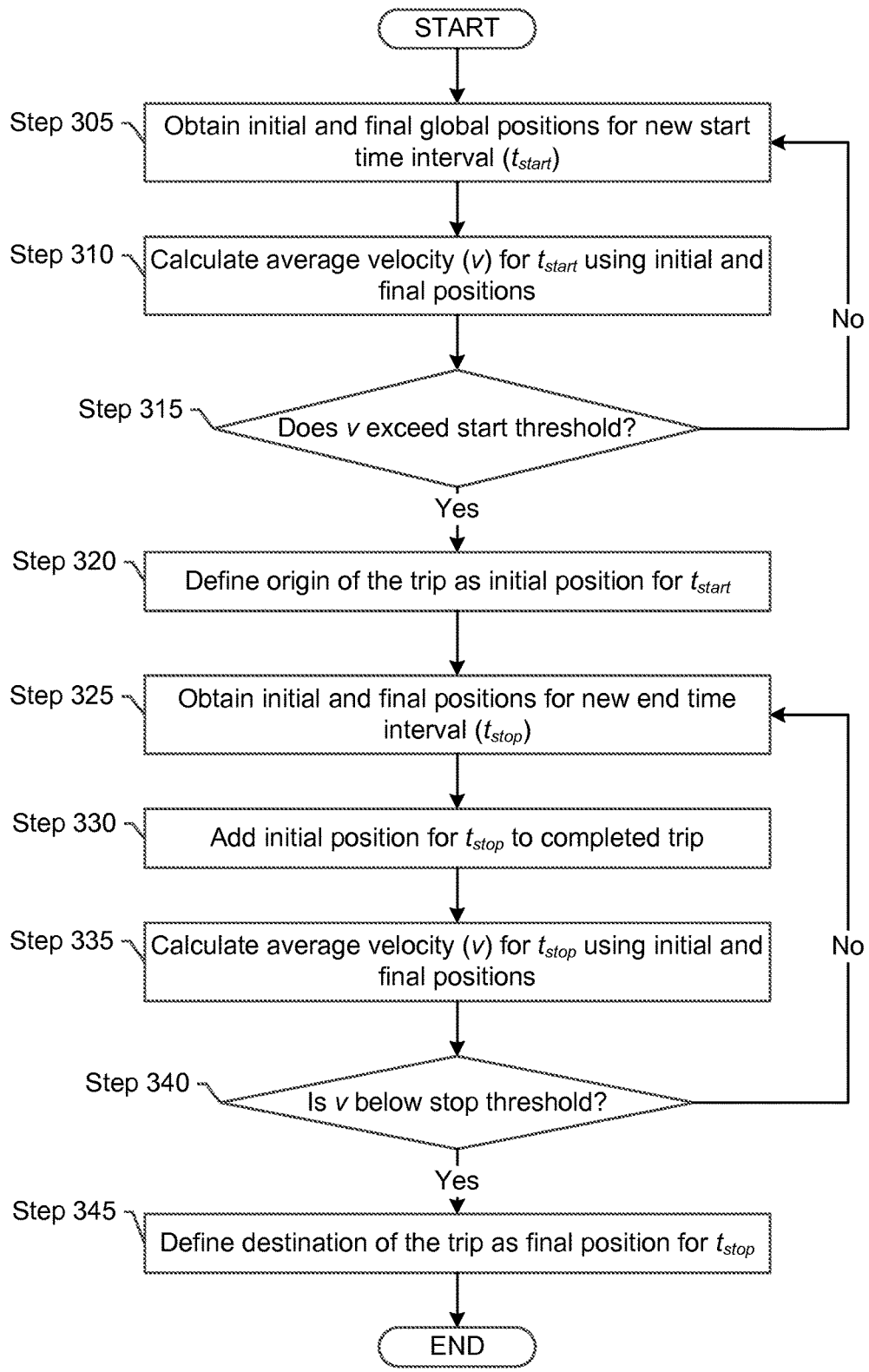

FIG. 3 shows a flowchart in accordance with one or more embodiments of the invention. The process shown in FIG. 3 may be used, for example, with the system of FIG. 1 to identify a completed trip taken by a user in possession of a mobile device. The sequence of steps shown in FIG. 3 may differ among embodiments of the invention, and one or more of the steps may be optional.

In Step 305, initial and final global positions of the mobile device are obtained at the endpoints of a start time interval ($t_{start}$). The start time interval is a predetermined length of time during which two positions of the mobile device are obtained, and based on the velocity to travel between the two positions during $t_{start}$ the origin of a trip can be identified. In other words, the start time interval is the predetermined length of time in which an origin of a trip is identified based on a velocity exceeding a threshold. In one or more embodiments of the invention, the start time interval and velocity may be used to distinguish between the user being in a car and a user walking. For example, let $t_{start}$ be a start time interval 12:00 to 12:02, having a length of two minutes. The global position and system time of the mobile device are obtained once at 12:00, and again at 12:02. $t_{start}$ may be any length of time appropriate to determine, with the desired level of accuracy, that at some time during $t_{start}$ the mobile device has begun to move at a sufficient velocity to indicate that the mobile device has started a trip in a motor vehicle. It may be desired to make $t_{start}$ a longer interval, for example, to conserve the battery life of the mobile device. Conversely, it may be desired to make $t_{start}$ a shorter interval to increase the amount of data obtained, and consequently, to obtain start times of vehicular trips with greater accuracy.

In Step 310, the average velocity (v) of the mobile device is calculated using the initial and final global positions and system times of the mobile device corresponding to $t_{start}$. V is calculated by dividing the distance traveled during $t_{start}$ by the time elapsed (e.g., two minutes).

In Step 315, a determination is made whether v exceeds a predetermined threshold velocity. The threshold velocity may be any predetermined value appropriate to determine that the mobile device is moving at a sufficient velocity to indicate that it is traveling in a motor vehicle. If v does not exceed the threshold, then the process may proceed back to step 305 after incrementing $t_{start}$. If v exceeds the threshold, then the process may proceed to Step 320.

For example, if v=0 km/h for $t_{start}$, the global position of the mobile device has remained unchanged over $t_{start}$, and the mobile device is likely in rest. If v=1 km/h for $t_{start}$, the global position changed only negligibly over $t_{start}$, and the mobile device is likely in motion, but at a sufficiently low velocity to indicate that the mobile device is not in a motor vehicle. For example, the mobile device may be in a user's front pocket while he or she walks a short distance. However, if v=60 km/h for $t_{start}$ it is likely that the mobile device has begun traveling in a motor vehicle.

In Step 320, in one or more embodiment of the invention, an origin for the completed trip may be defined as the initial global position of the mobile device corresponding to $t_{start}$. In other embodiments, the origin may be defined as the final position corresponding to $t_{start}$, or alternatively, the origin may be any position of the mobile device during $t_{start}$.

In Step 325, initial and final global positions of the mobile device are obtained at the endpoints of a stop time interval ($t_{stop}$). The stop time interval is a predetermined length of time during which two positions of the mobile device are obtained, and based on the velocity to travel between the two positions during $t_{stop}$ the destination of a trip can be identified. In other words, the stop time interval is the predetermined length of time in which a destination of a trip is identified based on a velocity being less than a threshold during the length of time. In one or more embodiments of the invention, the stop time interval and velocity may be used to distinguish between the user being stopped at a traffic light temporarily and a user completing a trip. For example, let $t_{stop}$ be a stop time interval 1:00 to 1:10, having a length of ten minutes. The global position and system time of the mobile device are obtained initially at 1:00, and again at 1:10. The length of $t_{stop}$ may be any predetermined length of time appropriate to determine, with the desired level of accuracy, which at some time during $t_{stop}$ the mobile device has either stopped moving or has slowed to a sufficient velocity to indicate that the mobile device is no longer traveling in a motor vehicle. $t_{stop}$ may be a longer interval to account for short stops in travel corresponding to waiting at street intersections or railway crossings. $t_{stop}$ may also be a longer interval to conserve the battery life of the mobile device. Conversely, $t_{stop}$ may be a shorter interval to increase the amount of data obtained, and consequently, to obtain end times of vehicular trips with greater accuracy.

In Step 330, in one or more embodiments of the invention, the initial global position of the mobile device corresponding to $t_{stop}$ may be added to the completed trip. In other embodiments, the final position corresponding to $t_{stop}$ may be added to the completed trip, or alternatively, any position of the mobile device during $t_{stop}$ may be added to the completed trip.

In Step 335, the average velocity (v) of the mobile device is calculated using the initial and final global positions and system times of the mobile device corresponding to $t_{stop}$. V is calculated by dividing the distance traveled during $t_{stop}$ by the time elapsed (e.g., ten minutes).

In Step 340, a determination is made whether v is below a predetermined stop threshold velocity. The stop threshold velocity may be any predetermined value appropriate to determine that the mobile device is no longer moving at a sufficient velocity to indicate that it is traveling in a motor vehicle. The stop threshold velocity may or may not equal the start threshold velocity. If v exceeds the stop threshold, then the process may proceed back to step 325 after incrementing $t_{stop}$. If v is below the stop threshold, then the process may proceed to Step 345.

In Step 345, a destination for the completed trip is defined as the final global position corresponding to $t_{stop}$. In other embodiments, the destination may be defined as the initial position corresponding to $t_{stop}$, or alternatively, the destination may be any position of the mobile device during $t_{stop}$. As the completed trip now includes an origin, a destination, and all positions in between, the process may proceed to end.

Figure 4:
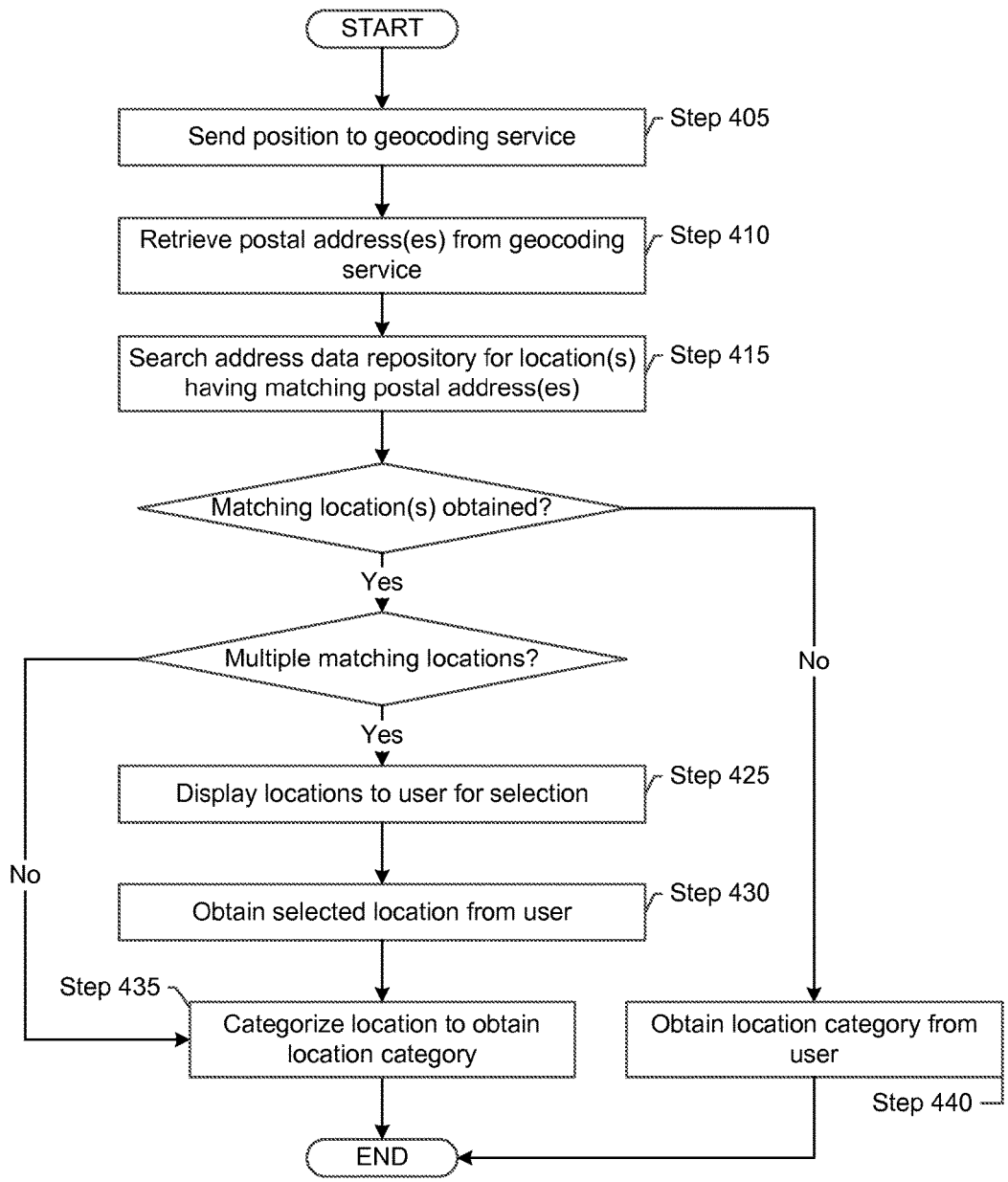

FIG. 4 shows a flowchart for categorizing a location in accordance with one or more embodiments of the invention. The process shown in FIG. 4 may be used, for example, with the system of FIG. 1 to categorize the origin and the destination of the completed trip. The sequence of steps shown in FIG. 4 may differ among embodiments of the invention, and one or more of the steps may be optional.

In Step 405, a global position of the mobile device is sent to a reverse geocoding service for processing. The position has previously been obtained from the GPS sensor by the tracking engine. For example, the GPS coordinates corresponding to a location near the center of San Antonio, Tex. (N29 25.42379 W98 29.6628) are obtained.

In Step 410, a postal address or a range of postal addresses corresponding to the global position is retrieved from the reverse geocoding service. For example, the reverse geocoding service may return a postal address range of 400-500 Main Street, San Antonio, Tex., 78204.

In Step 415, an address data repository is searched for one or more matching location names having addresses that match the address or range of addresses retrieved from the geocoding service. A determination is made of the number of matching locations that exist in the database. If one matching location is obtained, the process may proceed to step 435. If multiple matching locations are obtained, then the process may proceed to Step 425. If no matching locations have been found, then the process may proceed to Step 440.

In Step 425, if multiple matching locations have been obtained, the matching locations are displayed to the user via the user interface. The user may then select the matching location corresponding to the actual location visited by the user. For example, the user may be presented with Bexar County Courthouse and Bexar County Justice Center because these are the two buildings having addresses within the address range previously obtained (100-300 Dolorosa, San Antonio, Tex., 78204).

In Step 430, a location is selected by the user, corresponding to the actual location visited by the user. For example, the user may select, via the user interface, Planet Hollywood rather than Caesar's Palace if both locations correspond in the address data repository to the previously obtained address range.

In Step 435, the location is categorized to obtain a location category. Some locations can be automatically assigned a location category based on various data previously acquired by the system. In one or more embodiments of the invention, location categories may be learned based on times and days of the week that the mobile device is within a threshold distance of the same global position. For example, the mileage tracking application may determine that the global position of the mobile device is nearly always the same on weekdays at 2:00 p.m., and accordingly, the mileage tracking application may categorize that position as workplace and store the location category in the address data repository for future retrieval. For example, if it is determined that the mobile device is nearly always at a certain location at 3:00 AM, the location may be categorized as home.

In one or more embodiments, the location category may be identified based on information obtained from a financial application, such as an accounting application. For example, if the accounting application has a record of the work name of the user or home address of the user, the work name or home address may be obtained from the accounting application and used to categorize the origin and/or the destination. By way of another example, the type of employment or business may be used to categorize the origin and/or destination. The type of employment or business may be obtained from the accounting application. For example, if the user is a chef at a restaurant, a location corresponding to a restaurant supply story may be categorized as business. If the location category is incorrect, the user may change the location category at any time.

If a location has been previously defined or otherwise identified by the user, the location category may be retrieved from the application data repository. For example, if the user works at the Bexar County Courthouse and categorizes the Courthouse as his or her workplace, the global position of the location and its location category may be stored in the application data repository for later retrieval.

The origin and the destination may be categorized as one or more location categories according to their respective location names. For example, if the destination location name is an office supply store, the destination may be categorized as business.

In Step 440, if it has been determined in Step 420 that no matches have been found, a location category is obtained directly from the user. For example, the user interface may present the user with a choice of location categories.

Figure 5:
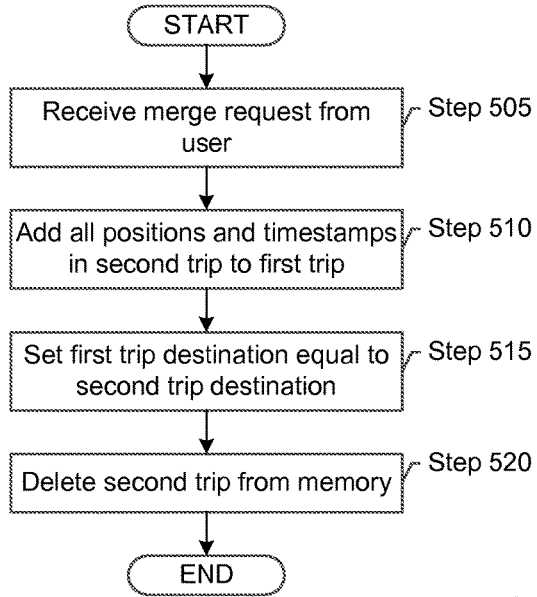

FIG. 5 shows a flowchart in accordance with one or more embodiments of the invention. The process shown in FIG. 3 may be used, for example, with the system of FIG. 1 to respond to a user request to merge a first completed trip and a second completed trip. The sequence of steps shown in FIG. 3 may differ among embodiments of the invention, and one or more of the steps may be optional.

In Step 505, a request to merge a first completed trip and a second completed trip is received from the user. The request may be received via the user interface. A merge request may be made when the mileage tracking application has mistakenly defined a single trip taken by the user as two separate completed trips. Such a mistake may occur, for example, if the user stops his vehicle at a train crossing for a period of time greater than the stop time interval chosen according to FIG. 3.

In Step 510, the global positions and timestamps in the second completed trip are added to the first completed trip. In Step 515, the destination of the first completed trip is set to equal the destination of the second completed trip. In Step 520, the second completed trip is deleted from memory.

Figure 6:
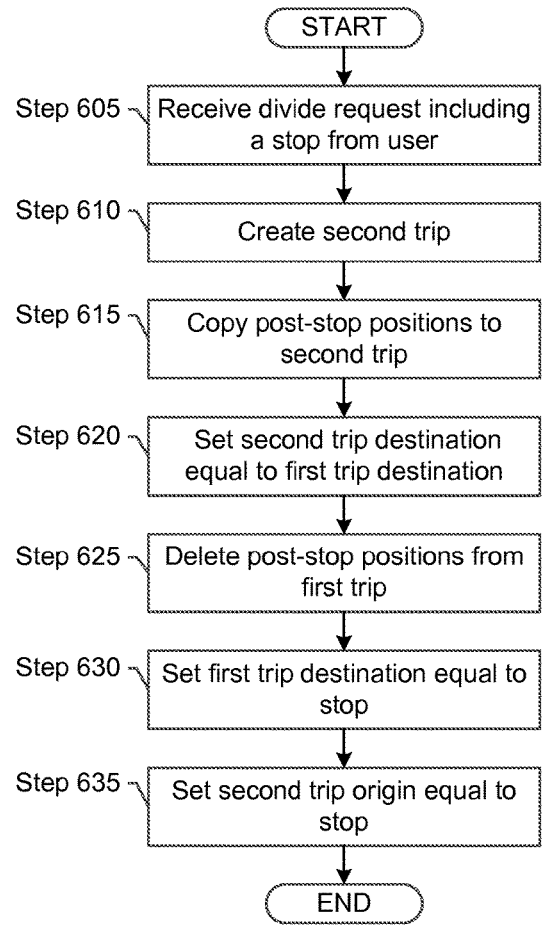

FIG. 6 shows a flowchart in accordance with one or more embodiments of the invention. The process shown in FIG. 3 may be used, for example, with the system of FIG. 1 to respond to a user request to divide a completed trip into a first new completed trip and a second new completed trip. The sequence of steps shown in FIG. 3 may differ among embodiments of the invention, and one or more of the steps may be optional.

In Step 605, a request to divide a first completed trip into two separate completed trips is received from the user. The request includes a global position of the first completed trip, identified by the user as a stop. The request may be received via the user interface. A divide request may be made when the mileage tracking application has mistakenly defined two separate trips taken by the user as a single completed trip.

In Step 610, a second completed trip is created. In Step 615, the stop and all global positions in the first completed trip having a timestamp later than the stop's timestamp are copied from the first completed trip to the second completed trip. In Step 620, the destination of the second completed trip is set to equal the destination of the first completed trip. In Step 625, all global positions having a timestamp later than the stop's timestamp are erased from the first completed trip. In Step 630, the destination of the first completed trip is set to equal the stop. In Step 635, the origin of the second completed trip is set to equal the stop.

While the various steps in these flowcharts are presented and described sequentially, one of ordinary skill will appreciate that some or all of the steps may be executed in different orders, may be combined or omitted, and some or all of the steps may be executed in parallel. Furthermore, the steps may be performed actively or passively.

The following example is for explanatory purposes only and not intended to limit the scope of the invention. In other words, the following example is an example of one embodiment of the invention. Other embodiments may exist without departing from the scope of the invention. Mr. Johnson is a criminal defense attorney living and working in San Antonio, Tex. Mr. Johnson always carries his mobile device on his person. The mileage tracking application has been installed on Mr. Johnson's device and runs continuously in the background. The mileage tracking application has previously categorized Mr. Johnson's office location as workplace and his apartment location as home. In other words, in one or more embodiments of the invention, the application data repository contains data associating the coordinates of Mr. Johnson's apartment to the home category, as well as data associating the coordinates of Mr. Johnson's office to the workplace category.

Mr. Johnson has not yet left his apartment this morning. The mileage tracking application on Mr. Johnson's mobile device has a start time interval set to 2 minutes and a start threshold velocity of 10 km/h. The tracking engine obtains the global position and timestamp of the mobile device at 8:42 a.m. and again at 8:44 a.m. The mileage tracking application calculates the average velocity of the mobile device over the start time interval, using the positions obtained at 8:42 a.m. and 8:44 a.m. Because Mr. Johnson has remained in his apartment during the interval, the average velocity of the mobile device is approximately 0 km/h, which is less than the start threshold of 10 km/h. Therefore, a trip has not yet begun, and the process starts over for a new start time interval.

Continuing with the example, Mr. Johnson departs from his apartment at 8:45 a.m. and travels by car approximately 10 km to his office, arriving at 8:59 a.m. The tracking engine obtains the global position and timestamp of the mobile device at 8:44 a.m. and again at 8:46 a.m. The mileage tracking application calculates the average velocity of the mobile device over the new start time interval, using the positions obtained at 8:44 a.m. and 8:46 a.m. Because Mr. Johnson has departed from his apartment and, during the interval, has traveled at an average rate faster than 10 km/h, it is determined that a trip has begun, and the origin of the trip is defined as the initial global position of the mobile device at 8:44 a.m. (i.e. Mr. Johnson's apartment.)

The mileage tracking application on Mr. Johnson's mobile device has a stop time interval set to 4 minutes and a stop threshold velocity of 10 km/h. The tracking engine obtains the global positions and timestamps of the mobile device at 8:46 a.m. and again at 8:50 a.m. The initial global position of the device at 8:46 is added to the trip. Because Mr. Johnson travels at an average rate faster than 10 km/h during the interval, it is determined that the trip has not yet ended. Accordingly, the process repeats for a new stop time interval. In this manner, the tracking engine obtains the global positions and timestamps of the mobile device for the intervals 8:50 a.m. to 8:54 a.m. and 8:54 a.m. to 8:58 a.m. The global positions of the device at 8:50 a.m. and 8:54 a.m. are added to the completed trip.

As stated previously, at 8:59 a.m., Mr. Johnson arrives at his destination and stops traveling in a motor vehicle. The global positions and timestamps of the mobile device are obtained at 8:58 a.m. and at 9:02 a.m. and the initial position at 8:58 a.m. is added to the completed trip. Because Mr. Johnson travels at an average rate slower than 10 km/h during the interval, a determination is made that the trip has ended, and the destination of the trip is defined as the final global position of the mobile device at 9:02 a.m. (i.e. Mr. Johnson's office). The mileage tracking application has now detected a completed trip having an origin and a destination, including all global positions obtained between the origin and the destination, inclusive.

The mileage tracking application searches the application data repository for the global positions corresponding to the origin and the destination. The mileage tracking application determines that the origin of the completed trip has previously been categorized as home, and the destination of the completed trip has previously been categorized as office.

Consequently, because the origin of the completed trip has a location category of home, the mileage tracking application categorizes the trip as personal. Personal trips are not deductible, so the mileage is not calculated as deductible.

At 12:00 p.m. Mr. Johnson leaves his office and walks briskly down the street to his favorite restaurant to purchase two habanero roast beef sandwiches. At 12:30 p.m. Mr. Johnson begins to walk slowly back to his office. Over lunch, initial and final global positions and timestamps are repeatedly obtained for new start time intervals. Because the average velocity of the device never exceeds 10 km/h, a trip is properly never detected.

At 2:00 p.m. Mr. Johnson departs from his office and travels by car approximately 30 miles to the Guadalupe County Courthouse, arriving at 3:00 p.m. During the trip, Mr. Johnson stops at a rail crossing between 2:30 p.m. and 2:40 p.m. while waiting for a train to pass.

The tracking engine obtains the global position and timestamp of the mobile device at 2:00 p.m. and again at 2:02 p.m. The mileage tracking application calculates the average velocity of the mobile device over the new start time interval, and the tracking engine determines that a trip has begun. The origin of the trip is defined as the global position corresponding to Mr. Johnson's office.

The tracking engine obtains the global positions and timestamps of the mobile device for several stop time intervals until, for the interval from 2:30 p.m. to 2:34 p.m., the tracking engine determines that the average velocity of the mobile device is less than the stop threshold velocity. This is due to the fact that Mr. Johnson has stopped at a train crossing. Accordingly, the mileage tracking application improperly defines the destination of the completed trip as the global position of the train crossing.

The tracking engine proceeds to obtain the global positions and timestamps of the mobile device for several start time intervals until, for the interval from 2:40 p.m. to 2:42 p.m., the tracking engine determines that the average velocity is greater than the start threshold velocity. A new origin of a second trip is defined as the global position of the train crossing. The tracking engine proceeds to obtain the global positions and timestamps of the mobile device for several stop time intervals until, for the interval 2:58 to 3:02, the tracking engine again determines that the average velocity of the mobile device is less than the stop threshold velocity. This is due to the fact that Mr. Johnson has reached his proper destination, the Guadalupe County Courthouse. The mileage tracking application defines the destination of the second trip as the global position corresponding to the Courthouse.

Mr. Johnson realizes that the mileage tracking application has mistakenly divided his trip into two legs, and using the interface, requests that the completed trips be merged. Accordingly, the mileage tracking application copies all positions and timestamps from the second completed trip to the first completed trip. The destination of the first trip is set to equal the destination of the second trip, the global position of the Courthouse. The second trip is deleted from memory, and the first trip now properly includes all global positions and timestamps between Mr. Johnson's office and the Courthouse.

At 5:00 p.m. Mr. Johnson departs the Guadalupe County Courthouse and travels home to his apartment. A completed trip is properly identified having an origin corresponding to the Courthouse and a destination corresponding to Mr. Johnson's apartment. The destination is categorized as home according to the information previously stored in the application data repository.

The origin's location category, however, is not found in the repository. Accordingly, the global position of the Courthouse is sent to a reverse geocoding service and the Courthouse's address (101 E. Court Street, Seguin, Tex., 78155) is retrieved. An address data repository containing government addresses is searched and a match is found. The mileage tracking application obtains the identity of the location corresponding to the address submitted (the aforementioned Guadalupe County Courthouse). Because only one location is retrieved, the user's origin is properly identified, and the application may proceed to categorize the origin, the destination, and the trip. Because the trip ends at home, the trip is ultimately categorized as personal.

Because Mr. Johnson is a criminal defense attorney, he makes several trips throughout the year to the courthouse, jail, and to visit various clients. Based on his profession, each of the trips is categorized as business trips. Further, the mileage tracking application stores timestamps and mileage for each of the trips. Additionally, with each trip, the mileage tracking engine learns more and more to appropriately categorize future trips. At the end of the year, the mileage tracking engine generates a report that includes all of the business trips during the year. For example, the report may be a tax return or a report to a tax application of the business trips. Thus, without having to keep track of each trip himself, Mr. Johnson is able to realize the benefit of the tax deductibility of his business trips.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for tracking mileage, comprising:
    obtaining, by a computer processor and via a global positioning system (GPS) sensor, a plurality of global positions of a mobile device;
    obtaining, via a system clock, a plurality of timestamps corresponding to the plurality of global positions;
    detecting, based on the plurality of global positions and the plurality of timestamps, a completed trip comprising the plurality of global positions and the plurality of timestamps, wherein the plurality of global positions comprises an origin and a destination;
    categorizing, from a plurality of location categories, the origin into an origin location category based on the plurality of global positions;
    determining that the mobile device is within a threshold distance of the destination at a same time of day on a plurality of days;
    in response to the determination, categorizing, by the computer processor and based on a type of business associated with a user of the mobile device obtained from a financial management application and from the plurality of location categories, the destination into a destination location category;
    categorizing, based on the origin location category and the destination location category, the completed trip into a completed trip category from a plurality of trip categories;
    calculating mileage based on the plurality of global positions of the completed trip; and
    storing, for the completed trip, the mileage and the completed trip category.

2. The method of claim 1, further comprising:
    obtaining a location name corresponding to the origin, wherein the origin location category is selected from the plurality of location categories based on the location name corresponding to the origin.

3. The method of claim 1, further comprising:
    receiving, from the user of the mobile device, a request to merge the completed trip with a subsequent trip;
    setting the destination of the completed trip equal to the destination of the subsequent trip;
    adding the plurality of global positions and the plurality of timestamps of the subsequent trip to the completed trip; and
    purging the subsequent trip.

4. The method of claim 1, further comprising:
    receiving, from the user of the mobile device, a request to divide the completed trip, wherein the request comprises a stop;

dividing, in response to the request, the completed trip into a first new completed trip comprising a new destination and a second new completed trip comprising a new origin; and setting the new destination and the new origin equal to the stop.

5. The method of claim 1, wherein the plurality of location categories comprises a workplace category, a business category, and a home category.

6. The method of claim 1, wherein the plurality of trip categories comprises a business trip category, a personal trip category, a charitable trip category, a medical trip category, and a relocation trip category.

7. The method of claim 1, wherein identifying the completed trip comprises:
calculating an average velocity using a second global position, a third global position, a second timestamp, and a third timestamp;
determining that the average velocity exceeds a start threshold velocity; and
identifying the origin as the second global position.

8. The method of claim 1, wherein a global position of the plurality of global positions comprises a set of GPS coordinates.

9. A system for tracking mileage comprising:
memory;
a GPS sensor configured to obtain a plurality of global positions of a mobile device and a plurality of timestamps corresponding to the plurality of global positions;
a system clock configured to generate the plurality of timestamps; and
a computer processor for executing a mileage tracking application stored in memory and comprising a tracking engine, which causes the computer processor to:
detect, based on the plurality of global positions and the plurality of timestamps, a completed trip comprising the plurality of global positions and the plurality of timestamps, wherein the plurality of global positions comprises an origin and a destination,
categorize, from a plurality of location categories, the origin into an origin location category based on the plurality of global positions,
determine that the mobile device is within a threshold distance of the destination at a same time of day on a plurality of days,
in response to the determination, categorize, based on a type of business associated with a user of the mobile device obtained from a financial management application and from the plurality of location categories, the destination into a destination location category,
categorize, based on the origin location category and the destination location category, the completed trip into a completed trip category from a plurality of trip categories,
calculate mileage based on the plurality of global positions of the completed trip, and
store, for the completed trip, the mileage and the completed trip category.

10. The system of claim 9, further comprising:
a mobile device comprising the memory, the computer processor, and the mileage tracking application.

11. The system of claim 9, further comprising:
an address data repository comprising mappings between addresses and location names,
wherein the tracking engine further causes the computer processor to:
obtaining a location name corresponding to the origin from the address data repository, wherein the origin location category is selected from the plurality of location categories based on the location name corresponding to the origin.

12. The system of claim 9, further comprising:
an application data repository comprising the plurality of location categories, the plurality of trip categories, and completed trip data comprising the mileage and completed trip category.

13. The system of claim 12, wherein the plurality of location categories comprises a workplace category, a business category, a home category, and a client category.

14. The system of claim 12, wherein the plurality of trip categories comprises a business trip category, a personal trip category, a charitable trip category, a medical trip category, and a relocation trip category.

15. A non-transitory computer readable medium storing instructions for tracking mileage, the instructions comprising functionality to:
obtain, by a computer processor and via a GPS sensor, a plurality of global positions of a mobile device;
obtain, via a system clock, a plurality of timestamps corresponding to the plurality of global positions;
detect, based on the plurality of global positions and the plurality of timestamps, a completed trip comprising the plurality of global positions and the plurality of timestamps, wherein the plurality of global positions comprises an origin and a destination;
categorize, from a plurality of location categories, the origin into an origin location category based on the plurality of global positions of the mobile device;
determine that the mobile device is within a threshold distance of the destination at a same time of day on a plurality of days;
in response to the determination, categorize, by the computer processor and based on a type of business associated with a user of the mobile device obtained from a financial management application and from the plurality of location categories, the destination into a destination location category;
categorize, based on the origin location category and the destination location category, the completed trip into a completed trip category from a plurality of trip categories;
calculate mileage based on the plurality of global positions of the completed trip; and
store, for the completed trip, the mileage and the completed trip category.

16. The non-transitory computer readable medium of claim 15, the instructions further comprising functionality to:
obtain a location name corresponding to the origin, wherein the origin location category is selected from the plurality of location categories based on the location name corresponding to the origin.

17. The non-transitory computer readable medium of claim 15, the instructions further comprising functionality to:
receive, from the user of the mobile device, a request to merge the completed trip with a subsequent trip;
set the destination of the completed trip equal to the destination of the subsequent trip;

add the plurality of global positions and the plurality of timestamps of the subsequent trip to the completed trip; and purge the subsequent trip.

18. The non-transitory computer readable medium of claim 15, the instructions further comprising functionality to:

receive, from the user of the mobile device, a request to divide the completed trip, wherein the request comprises a stop;

divide, in response to the request, the completed trip into a first new completed trip comprising a new destination and a second new completed trip comprising a new origin; and set the new destination and the new origin equal to the stop.

19. The non-transitory computer readable medium of claim 15, wherein the plurality of location categories comprises a workplace category, a business category, and a home category.

20. The non-transitory computer readable medium of claim 15, wherein the plurality of trip categories comprises a business trip category, a personal trip category, a charitable trip category, a medical trip category, and a relocation trip category.

21. The non-transitory computer readable medium of claim 15, wherein identifying the completed trip comprises:

calculate an average velocity using a first global position, a second global position, a first timestamp, and a second timestamp;

determine that the average velocity exceeds a start threshold velocity; and identify the origin as the first global position.

* * * * *